A. FONÓ.
POWER TRANSMITTER.
APPLICATION FILED JAN. 18, 1912.
1,060,073.
Patented Apr. 29, 1913.
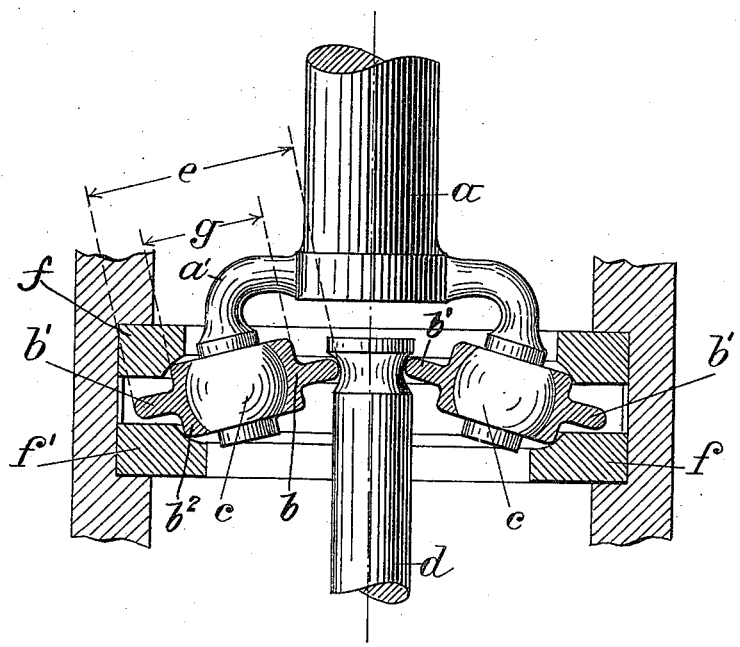

UNITED STATES PATENT OFFICE.

ALBERT FONÓ, OF BUDAPEST, AUSTRIA-HUNGARY.

POWER-TRANSMITTER.

1,060,073.  Specification of Letters Patent.  Patented Apr. 29, 1913.

Application filed January 18, 1912. Serial No. 671,947.

*To all whom it may concern:*

Be it known that I, ALBERT FONÓ, subject of the King of Hungary, residing at Budapest, Empire of Austria-Hungary, have invented new and useful Improvements in Power-Transmitters, of which the following is a specification.

My invention relates to improvements in power transmitters and one of the special objects of the invention is to provide a speed reducing transmitter capable of widely varying reduction of speed.

The device of my invention will be more fully described in connection with the accompanying drawing and will be more particularly pointed out in and by the appended claims.

The drawing shows one form of my invention partly in section and partly in elevation.

As illustrated, my invention embodies a slow speed shaft $a$ and a high speed shaft $d$, which shafts are disposed in alined relation. The slow speed shaft $a$ is provided, as shown, with a bracket $a'$ carrying a rounded journal $c$. On the journal $c$ is rotatably mounted a rotary element $b$ and the axis of the same is angular to the axis of the alined shafts $a$ and $d$. The element $b$ is provided with a relatively large annular portion $b'$ and two relatively reduced annular portions $b^2$, separated from each other and being, in the present construction, disposed on opposite sides of the portion $b'$.

A fixed ring is provided which may be in the form of divided annular members $f$ mounted in a suitable support $f'$.

As indicated at $e$ and $g$, it will be seen that the portions $b$ and $b^2$ are of different diameters and the portions $b^2$ are in frictional engagement with the fixed rings $f$ while the portion $b$ is in engagement with the high speed shafts $d$.

It will be obvious that the arrangement shown at the left of the shafts $a$ and $b$ may be duplicated at the right of the shafts but inasmuch as both sides are alike they need not be separately described.

The speed can be greatly varied by utilizing elements having greatly reduced portions $b^2$ without altering the diameter of the part $b$.

While I have herein shown and described one specific embodiment of my invention it will be understood that I do not wish to be limited thereto except for such limitations as the claims import.

I claim:

1. The combination with axially alined high and low speed shafts, of a fixed ring concentrically disposed about said shafts, and a rotary element carried by one of said shafts and having a relatively enlarged portion engaging one of said shafts and a relatively reduced portion engaging said ring, said rotary element having its axis inclined with respect to the common axis of said shafts and ring, substantially as and for the purposes set forth.

2. The combination with axially alined high and low speed shafts, the former having a friction groove, of a fixed ring concentrically disposed about said shafts, and a plurality of rotary elements carried by said low speed shaft and having relatively enlarged portions engaging the groove of said high speed shaft at opposed points with respect thereto and provided with relatively reduced portions engaging said ring, the axes of said elements being inclined with respect to the common axis of said ring and shafts, substantially as and for the purposes set forth.

In testimony whereof I have signed my name to this specification in the presence of two subscribing witnesses.

ALBERT FONÓ.

Witnesses:
 ROBERT BÉRCZI,
 HUGH KEMÉNY.

Copies of this patent may be obtained for five cents each, by addressing the "Commissioner of Patents, Washington, D. C."